US012251935B2

(12) United States Patent
Matsuda et al.

(10) Patent No.: US 12,251,935 B2
(45) Date of Patent: Mar. 18, 2025

(54) LIQUID DISCHARGE HEAD, LIQUID DISCHARGE UNIT, AND LIQUID DISCHARGE APPARATUS

(71) Applicants: Yukimasa Matsuda, Kanagawa (JP); Keishi Miwa, Kanagawa (JP)

(72) Inventors: Yukimasa Matsuda, Kanagawa (JP); Keishi Miwa, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 183 days.

(21) Appl. No.: 18/088,779

(22) Filed: Dec. 27, 2022

(65) Prior Publication Data

US 2023/0249461 A1 Aug. 10, 2023

(30) Foreign Application Priority Data

Feb. 7, 2022 (JP) ................................ 2022-017324

(51) Int. Cl.
*B41J 2/14* (2006.01)

(52) U.S. Cl.
CPC ....... *B41J 2/14233* (2013.01); *B41J 2/14201* (2013.01); *B41J 2/14274* (2013.01)

(58) Field of Classification Search
CPC ................ B41J 2/14201; B41J 2/14233; B41J 2/14274; B41J 2002/14241; B41J 2002/14419; B41J 2202/12; B41J 2202/20
See application file for complete search history.

(56) References Cited

U.S. PATENT DOCUMENTS

2015/0375505 A1 12/2015 Takahashi
2016/0096386 A1* 4/2016 Yoshiike .................. B41J 25/34 347/37
2018/0290446 A1* 10/2018 Kohda .................. B41J 2/1433
2020/0307206 A1* 10/2020 Mizuno ................ B41J 2/14201

FOREIGN PATENT DOCUMENTS

JP 2006-224672 8/2006
JP 2016-026912 2/2016

* cited by examiner

*Primary Examiner* — Anh T Vo
(74) *Attorney, Agent, or Firm* — XSENSUS LLP

(57) ABSTRACT

A liquid discharge head includes: multiple pressure chambers respectively communicating with multiple nozzles from each of which a liquid is discharged; a diaphragm defining a part of a wall of the multiple pressure chambers; an electromechanical conversion element attached to the diaphragm, the electromechanical conversion element configured to deform the diaphragm to discharge the liquid in the multiple pressure chambers through the multiple nozzles in a discharge direction; a damper film having a first surface and a second surface opposite to the first surface; a channel substrate including: a common chamber communicating with each of the multiple pressure chambers; and a first bonding portion bonded to the first surface of the damper film; and a damper substrate including a second bonding portion bonded to the second surface of the damper film.

14 Claims, 17 Drawing Sheets

COMPARATIVE EXAMPLE 1

COMPARATIVE EXAMPLE 1

LIQUID DISCHARGE HEAD, LIQUID DISCHARGE UNIT, AND LIQUID DISCHARGE APPARATUS

CROSS-REFERENCE TO RELATED APPLICATIONS

This patent application is based on and claims priority pursuant to 35 U.S.C. § 119(a) to Japanese Patent Application No. 2922-017324, filed on Feb. 7, 2022, in the Japan Patent Office, the entire disclosure of which is hereby incorporated by reference herein.

BACKGROUND

Technical Field

Embodiments of this disclosure relate to a liquid discharge head, a liquid discharge unit, and a liquid discharge apparatus.

Related Art

A liquid discharge head drives an electromechanical conversion element to discharge, through each nozzle, a liquid in each pressure chamber supplied from a liquid channel.

In some liquid discharge heads, in order to absorb pressure fluctuations in a common chamber that is a liquid channel, a damper film is bonded to a frame member serving as a channel substrate including the common chamber and to a member that is disposed on a damper chamber side on the opposite side of the common chamber with the damper film interposed therebetween and has an opening formed to allow deformation of the damper film.

SUMMARY

In an aspect of the present disclosure, a liquid discharge head includes: multiple pressure chambers respectively communicating with multiple nozzles from each of which a liquid is discharged; a diaphragm defining a part of a wall of the multiple pressure chambers; an electromechanical conversion element attached to the diaphragm, the electromechanical conversion element configured to deform the diaphragm to discharge the liquid in the multiple pressure chambers through the multiple nozzles in a discharge direction; a damper film having a first surface and a second surface opposite to the first surface; a channel substrate including: a common chamber communicating with each of the multiple pressure chambers; and a first bonding portion bonded to the first surface of the damper film; and a damper substrate including a second bonding portion bonded to the second surface of the damper film, wherein at least one of the first bonding portion or the second bonding portion has a shape widening toward the damper film, and an angle of said at least one of the first bonding portion or the second bonding portion with the damper film is an acute angle.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
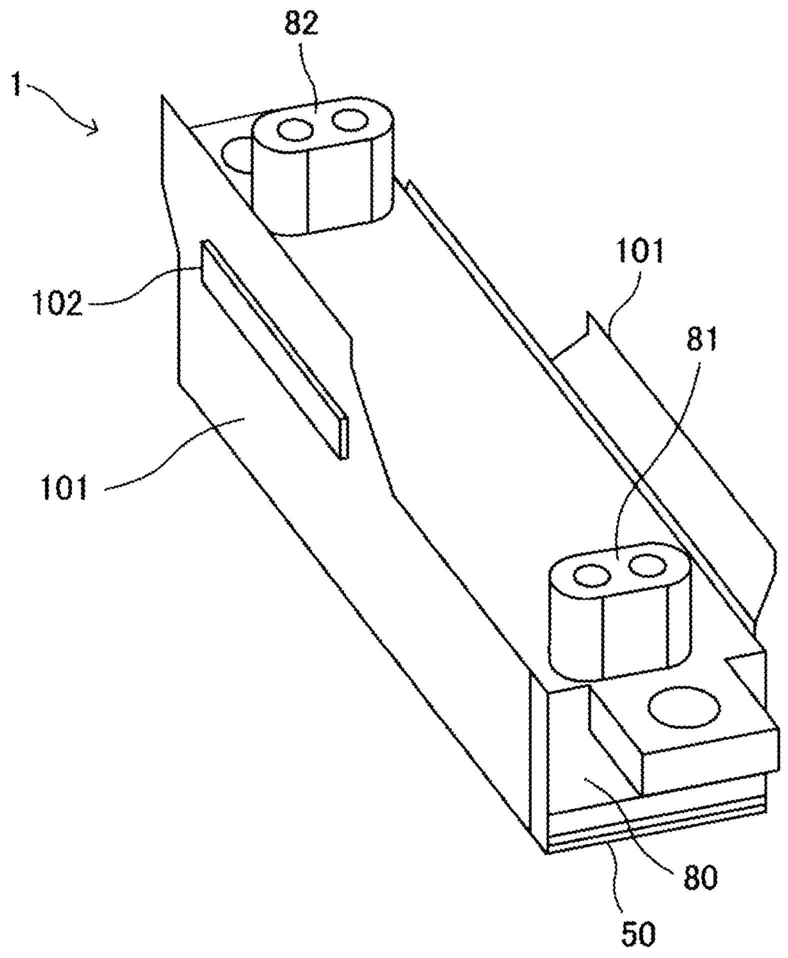
FIG. 1 is a perspective view of an external appearance of a liquid discharge head according to the present embodiment.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

The following is a description of an embodiment Where the present embodiment is applied to a liquid discharge head included in a liquid discharge apparatus.

FIG. 1 is a perspective view of an external appearance of the liquid discharge head according to the present embodiment.

Figure 2:
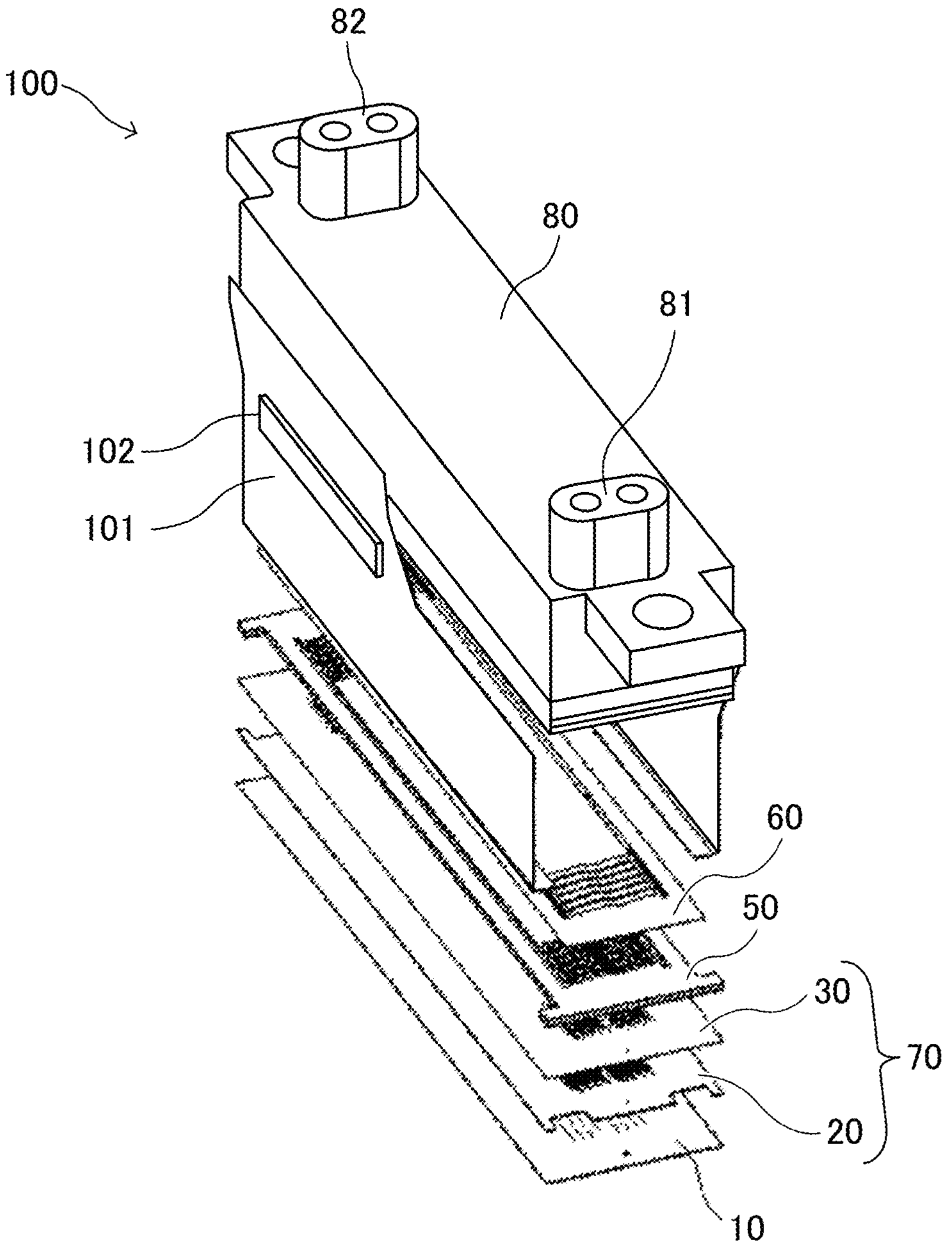
FIG. 2 is an exploded, perspective view of the liquid discharge head.

FIG. 2 is an exploded, perspective view of the liquid discharge head.

Figure 3:
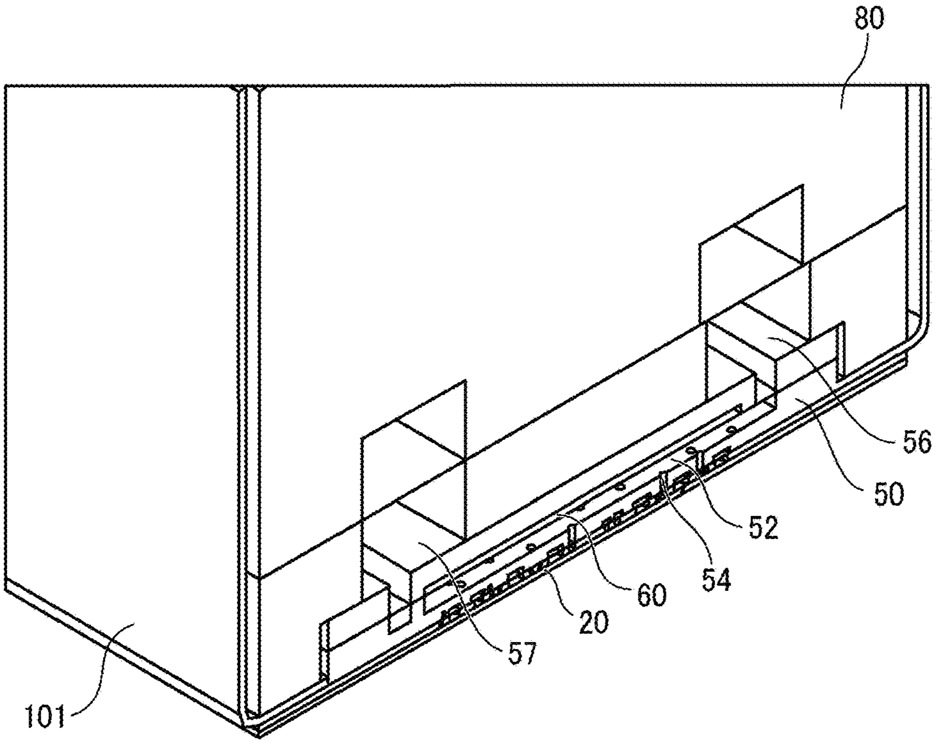
FIG. 3 is a perspective, cross-sectional view of the liquid discharge head.

FIG. 3 is a perspective, cross-sectional view of the liquid discharge head.

Figure 4:
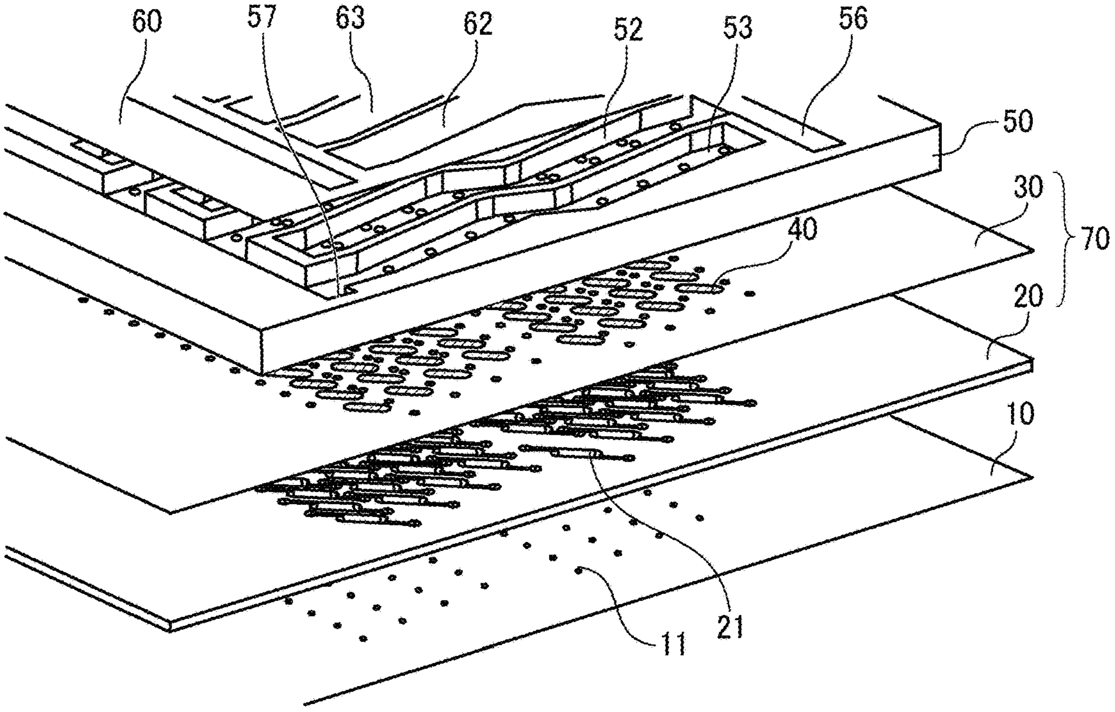
FIG. 4 is an exploded, perspective view of the liquid discharge head excluding a frame member.

FIG. 4 is an exploded, perspective view of the liquid discharge head excluding a frame member.

Figure 5:
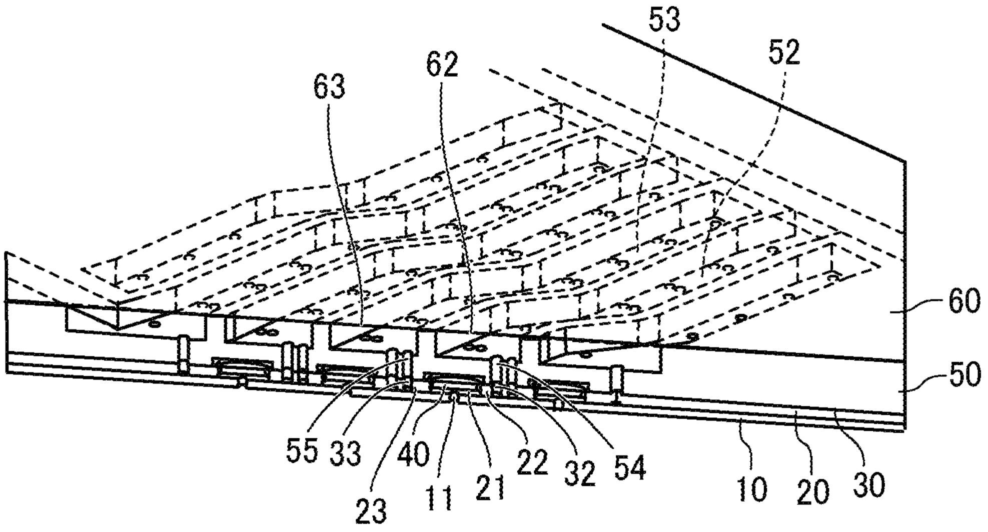
FIG. 5 is a perspective, cross-sectional view of a channel portion of the liquid discharge head.

FIG. 5 is a perspective, cross-sectional view of a channel portion of the liquid discharge head.

Figure 6:
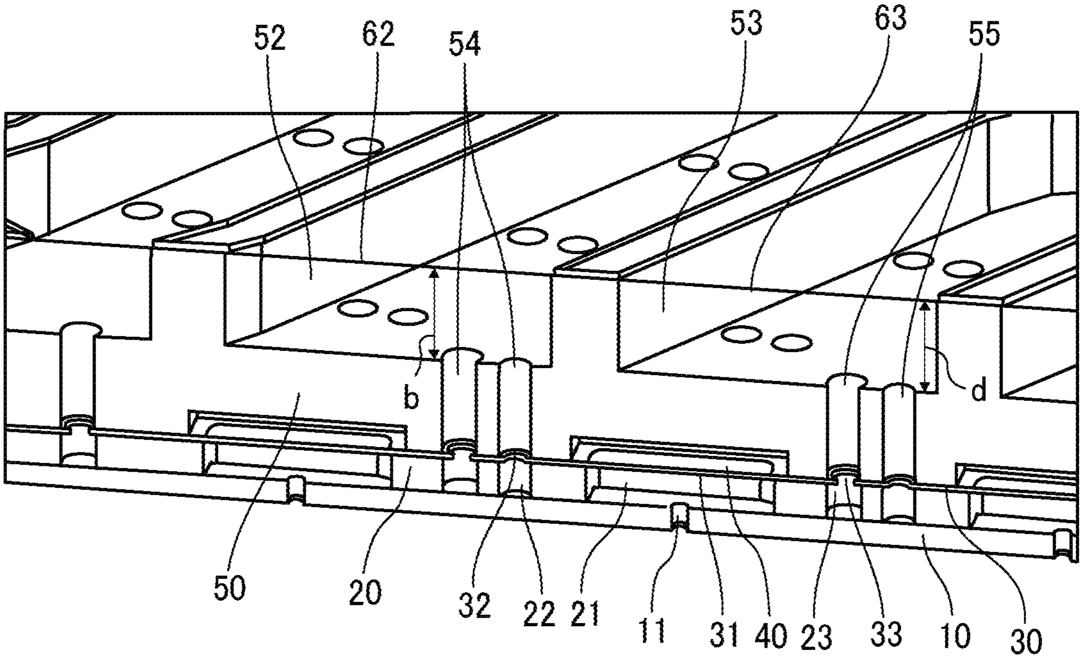
FIG. 6 is an enlarged, perspective, and cross-sectional view of the channel portion of the liquid discharge head.

FIG. 6 is an enlarged, perspective, and cross-sectional view of the channel portion of the liquid discharge head.

Figure 7:
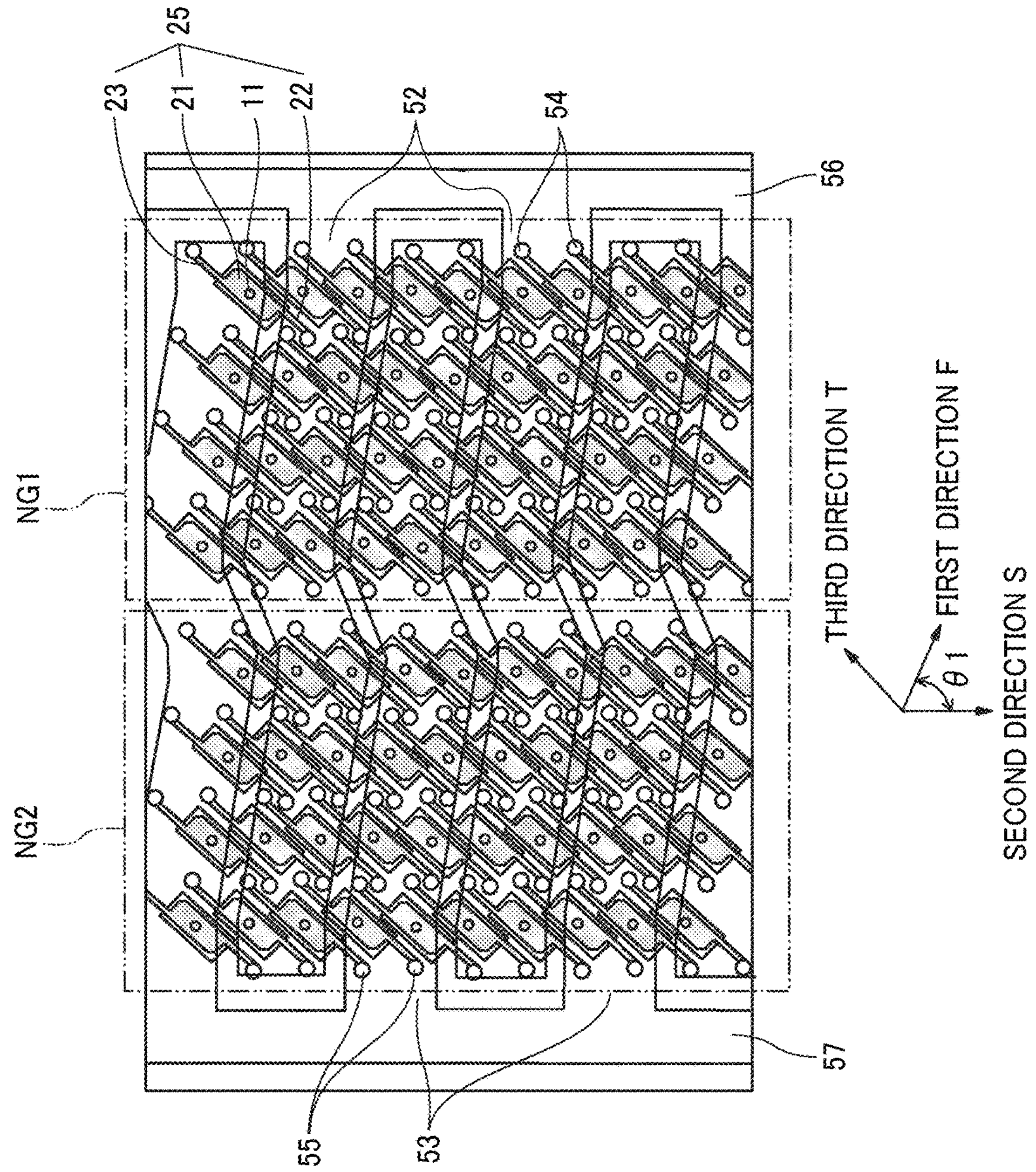
FIG. 7 is a plan view of the channel portion of the liquid discharge head.

FIG. 7 is a plan view of the channel portion of the liquid discharge head.

A liquid discharge head 1 according to the present embodiment includes a nozzle substrate 10, an actuator substrate 70, a common channel substrate 50, a damper member 60, a frame member 80, and a substrate (flexible wiring substrate 101) where drive circuitry 102 is mounted. The actuator substrate 70 includes an individual channel substrate 20 and a diaphragm 30. Hereinafter, the liquid discharge head 1 is referred simply as a "head".

The nozzle substrate 10, the actuator substrate 70, the common channel substrate 50, and the damper member 60 each include a single-crystal Si wafer as a substrate material. A plurality of chips (head) is simultaneously fabricated on the Si wafer by using a microfabrication technology for microelectromechanical system (MEMS) and semiconductor devices, and substrates are bonded to each other after chipping to form a head.

The nozzle substrate 10 includes a plurality of nozzles 11 that discharges the liquid. The nozzles 11 are arranged in a two-dimensional matrix and are arranged side by side in three directions: a first direction F, a second direction S, and a third direction T, as illustrated in FIG. 7.

The individual channel substrate 20 forms a plurality of pressure chambers 21 (also referred to as individual chambers) communicating with the nozzles 11, respectively, a plurality of individual supply channels 22 communicating with the pressure chambers 21, respectively, and a plurality of individual collection channels 23 communicating with the pressure chambers 21, respectively. One of the pressure chambers 21, and the individual supply channel 22 and the individual collection channel 23, which communicate with the pressure chamber 21, are collectively referred to as an individual channel 25.

The diaphragm 30 forms a deformable vibration wall surface 31 of the pressure chamber 21. The vibration wall surface 31 is formed together with a piezoelectric element 40 as a single unit. The diaphragm 30 is provided with a supply side opening 32 communicating with the individual supply channel 22 and a collection side opening 33 communicating with the individual collection channel 23. The piezoelectric element 40 is an electromechanical conversion element and is a pressure generator that deforms the vibration wall surface 31 to apply a pressure to the liquid in the pressure chamber 21.

The individual channel substrate 20 and the diaphragm 30 are not limited to being separate members. For example, a Silicon On Insulator (SOI) substrate may be used to form the individual channel substrate 20 and the diaphragm 30 as a single unit with the identical material. Specifically, by using an SOI substrate with a silicon dioxide film, a silicon layer, and a silicon dioxide film deposited in this order on a silicon substrate, the silicon substrate may form the individual channel substrate 20, and the silicon dioxide film, the silicon layer, and the silicon dioxide film may form the diaphragm 30. In this configuration, the layer structure of the silicon dioxide film, the silicon layer, and the silicon dioxide film in the SOI substrate forms the diaphragm 30. Thus, the diaphragm 30 includes a diaphragm including a material deposited on the surface of the individual channel substrate 20.

The common channel substrate 50 includes a plurality of common supply channel branch streams 52, which are common chambers communicating with the two or more individual supply channels 22, and a plurality of common collection channel branch streams 53, which are common chambers communicating with the two or more individual collection channels 23. The common supply channel branch streams 52 and the common collection channel branch streams 53 are formed adjacent to each other and arranged alternately in the second direction S of the nozzle 11.

The common channel substrate 50 is provided with a through hole serving as a supply port 54 communicating between the supply side opening 32 of the individual supply channel 22 and the common supply channel branch stream 52 and a through hole serving as a collection port 55 communicating between the collection side opening 33 of the individual collection channel 23 and the common collection channel branch stream 53.

The common channel substrate 50 is provided with one or more common supply channel primary streams 56 communicating with the common supply channel branch streams 52 and one or more common collection channel primary streams 57 communicating with the common collection channel branch streams 53.

The damper member 60 includes a supply side damper 62 opposed to (facing) the supply port 54 of the common supply channel branch stream 52 and a collection side damper 63 opposed to (facing) the collection port 55 of the common collection channel branch stream 53.

The common supply channel branch stream 52 and the common collection channel branch stream 53 are configured such that groove portions of the identical material alternately arranged side by side on the common channel substrate 50 are sealed by the supply side damper 62 or the collection side damper 63 of the damper member 60. It is preferable to use a metallic thin film or an inorganic thin film, which is resistant to organic solvents, as a damper of the damper member 60. The thickness of portions of the supply side damper 62 and the collection side damper 63 of the damper member 60 is preferably 10 μm or less.

The head 1 according to the present embodiment includes the damper member 60 to suppress the effect (e.g., crosstalk) of pressure fluctuations occurring in the liquid channel (e.g., the individual supply channel 22) during liquid discharge through the nozzle 11 on liquid discharge through the other nozzles 11. The damper member 60 appropriately performs a damper function so as to suppress crosstalk affecting liquid discharge through the adjacent nozzle due to the propagation of vibrations (pressure fluctuations) during liquid discharge through the liquid and so as to stabilize the liquid discharge accuracy of each of the nozzles 11.

Figure 8:
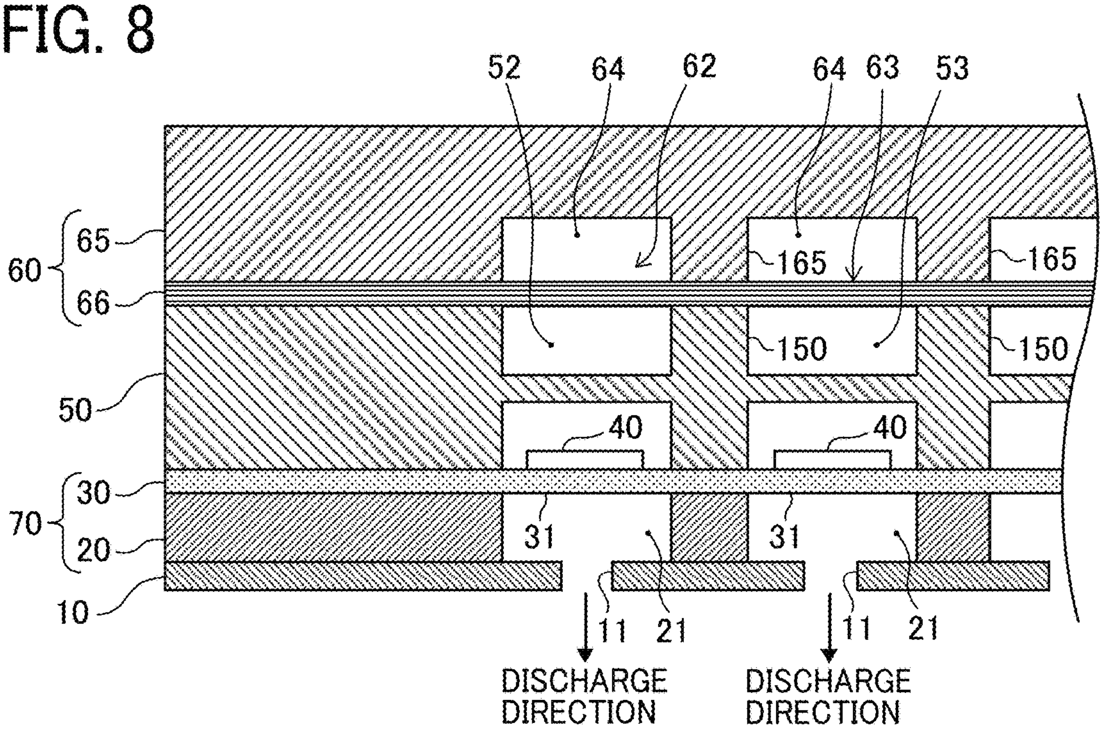
FIG. 8 is a schematic, cross-sectional view of a primary portion of the liquid discharge head.

FIG. 8 is a schematic, cross-sectional view of a primary portion of the head 1.

FIG. 8 is a cross-sectional view of the head 1 taken in a laminating direction in which the common channel substrate 50, a damper film 66, and a damper frame substrate 65 are laminated.

The damper member 60 includes the damper film 66, which includes a metallic thin film or an inorganic thin film and is bonded to the common channel substrate 50, and the damper frame substrate 65, which forms a displacement space (void) to enable displacement of the damper film 66 and serves as a damper holding substrate bounded to the damper film 66. Examples of the damper film 66 as an inorganic thin film include a three-layered Si damper film in which a silicon nitride film is sandwiched between silicon dioxide films. Thus, the damper film having the laminated structure makes it possible to easily obtain the functions for the damper, e.g., securing the film rigidity and avoiding buckling as damper functions.

The supply side damper 62 and the collection side damper 63 of the damper member 60 include a void 64 (recessed portion) formed in the damper frame substrate 65 and the damper film 66 covering the recessed portion. The void 64 (recessed portion) is a displacement space to allow displacement of the damper film 66. The voids 64 of the supply side damper 62 and the collection side damper 63 are partitioned from each other by a void partition wall 165. The common supply channel branch stream 52 and the common collection channel branch stream 53 are partitioned from each other by a channel partition wall 150.

Figure 9:
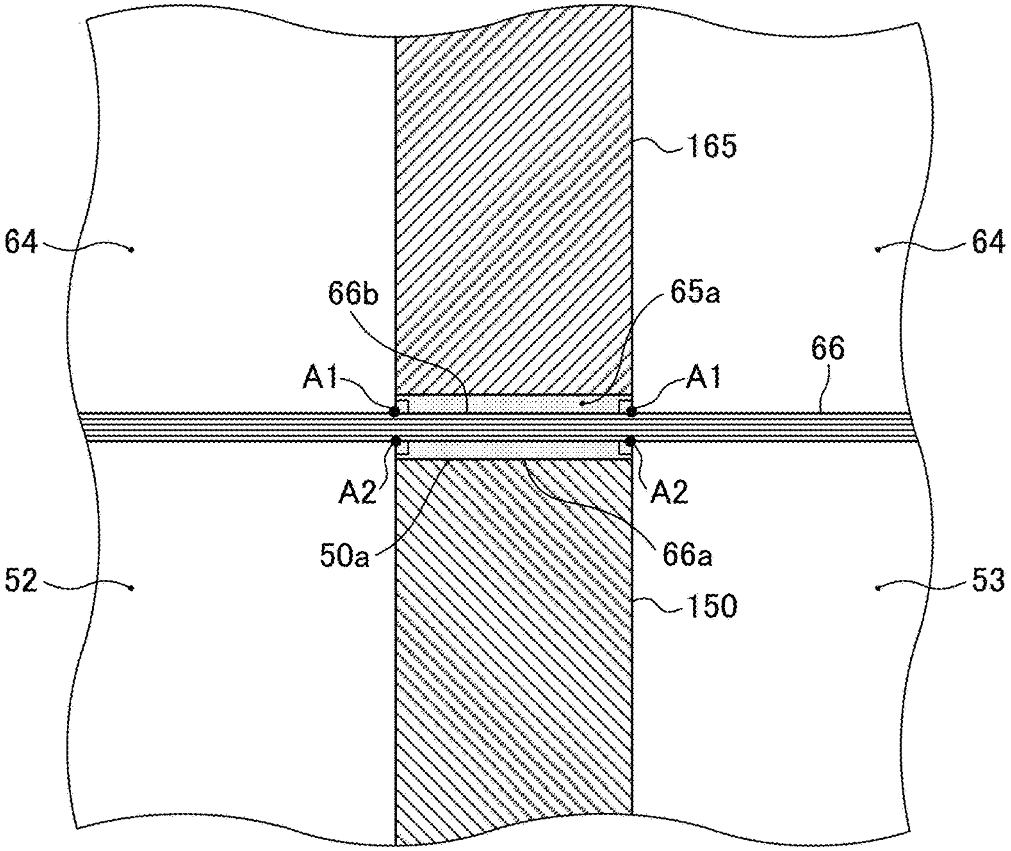
FIG. 9 is an enlarged, cross-sectional view of a primary portion of a comparative example of a liquid discharge head.

FIG. 9 is an enlarged, cross-sectional view of a main portion of a comparative example of a head taken in the above-described laminating direction.

As illustrated in FIG. 9, the void partition wall 165 of the damper member 60 and the channel partition wall 150 of the common channel substrate 50 are each bonded to the damper film 66 with an adhesive. The cross-sectional shape of an adhesive layer 65*a* is a rectangular shape having substantially the same length as that of the void partition wall 165 in a right-and-left direction in the figure. Therefore, the angle formed between the damper film 66 and an edge face of a bonding portion between the void partition wall 165 and the damper film 66 is substantially a right angle. An adhesive layer 50*a* bonding the channel partition wall 150 and the damper film 66 also has a rectangular shape having substantially the same length as that of the channel partition wall 150 in the right-and-left direction in the figure. Therefore, the angle formed between the damper film 66 and the edge face of the bonding portion between the channel partition wall 150 and the damper film 66 is also substantially a right angle.

In a configuration of a comparative example 1 illustrated in FIG. 9, cracks occur in an edge portion A1 of a bond surface 66*b* of the damper film 66 with the void partition wall 165 and in an edge portion A2 of a bond surface 66*a* with the channel partition wall 150. In a structure according to the comparative example 1, the damper film 66 is rapidly deformed during damping based on the edge portions A1 and A2 of the bond surfaces 66*a* and 66*b*, stress concentration occurs at the above-described edge portions A1 and A2, and cracks occur at the above-described edge portions A1 and A2.

Figure 10:
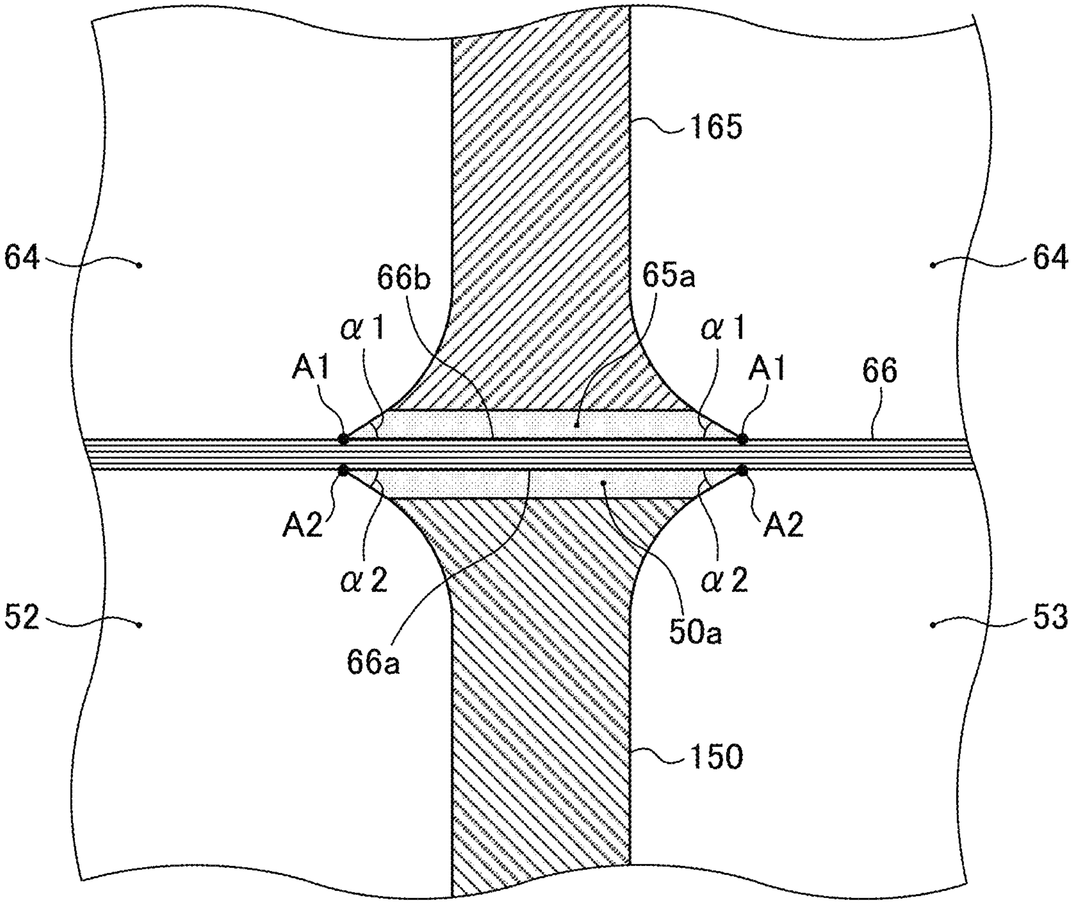
FIG. 10 is an enlarged, cross-sectional view of a primary portion of the liquid discharge head according to the present embodiment.

FIG. 10 is an enlarged, cross-sectional view of a primary portion of the head according to the present embodiment taken in the above-described laminating direction.

As illustrated in FIG. 10, according to the present embodiment, the cross-sectional shape of the bonding portion including an edge portion of the void partition wall 165 on the side of the damper film 66 and the adhesive layer 65*a* is a shape widening toward the end in which an angle α1 formed with the damper film 66 is an acute angle. Similarly, the cross-sectional shape of the bound portion including an edge portion of the channel partition wall 150 on the side of the damper film 66 and the adhesive layer 50*a* is a shape widening toward the end in which an angle α2 formed with the damper film 66 is an acute angle.

As described above, each of the bonding portions has a shape widening toward the end so as to widen toward the damper film 66, and therefore the thickness of each of the bonding portions gradually decreases toward the edge portions A1 and A2 of the bond surfaces 66*a* and 66*b* of the damper film 66. Accordingly, the rigidity of each of the bonding portions in the deformation direction (an up-and-down direction in the figure) of the damper film 66 may be gradually decreased toward the edge portions A1 and A2 of the bond surfaces. This causes, during damping of the damper film 66, elastic deformation of the vicinity of the edge portion of the bonding portion together with the damper film 66 and causes gradual elastic deformation of the whole vicinity of the bonding portion of the damper film with each of the channel partition walls 150 and the void partition walls 165 on the side of the edge portions A1 and A2. Therefore, it is possible to suppress the occurrence of an area of stress concentration in the damper film 66 during damping and to suppress the occurrence of cracks in the damper film 66.

The smaller the angles α1 and α2 formed between the bonding portions and the damper film 66, the more gradual the decrease in the rigidity of the bonding portion may be, and the more gradual the deformation in the vicinity of the edge portions A1 and A2 of the bond surfaces of the damper film during damping may be, which is desirable.

The shape widening toward the end on the side of the damper film in the void partition wall 165 and the channel partition wall 150 may be formed by adjusting conditions for etching photolithography. The shapes of the adhesive layers 65*a* and 50*a* are formed as described below. Specifically, the adhesive for bonding the channel partition walls 150 and the void partition walls 165 to the damper film 66 is applied by thin-film transfer, and the bond surfaces 66*a* and 66*b* of the damper film 66 to which the adhesive is applied are subjected to surface treatment to increase the wettability of the adhesive and facilitate spread of the adhesive. This allows each of the adhesive layers 65*a* and 50*a* to have a shape widening toward the end such that the thickness of both edges gradually decreases toward the edge portions A1 and A2 of the bond surfaces.

Next, the driving endurance test of the head will be described.

For the driving endurance test, embodiments and a comparative example were prepared in which the structures of the bonding portions between the channel partition walls 150, the void partition walls 165 and the damper film 66 are different from each other, and the piezoelectric element 40 was driven with a drive waveform of 30V and 80 KHz. Then, discharge was evaluated every ten billion time, the head with faulty discharge was disassembled and the damper film 66 was observed with an IR microscope.

First Embodiment

According to a first embodiment, both the bonding portion between the damper film 66 and the void partition wall 165 and the bonding portion between the damper film 66 and the channel partition wall 150 illustrated in FIG. 10 have a shape widening toward the end in cross-section.

Second Embodiment

Figure 11:
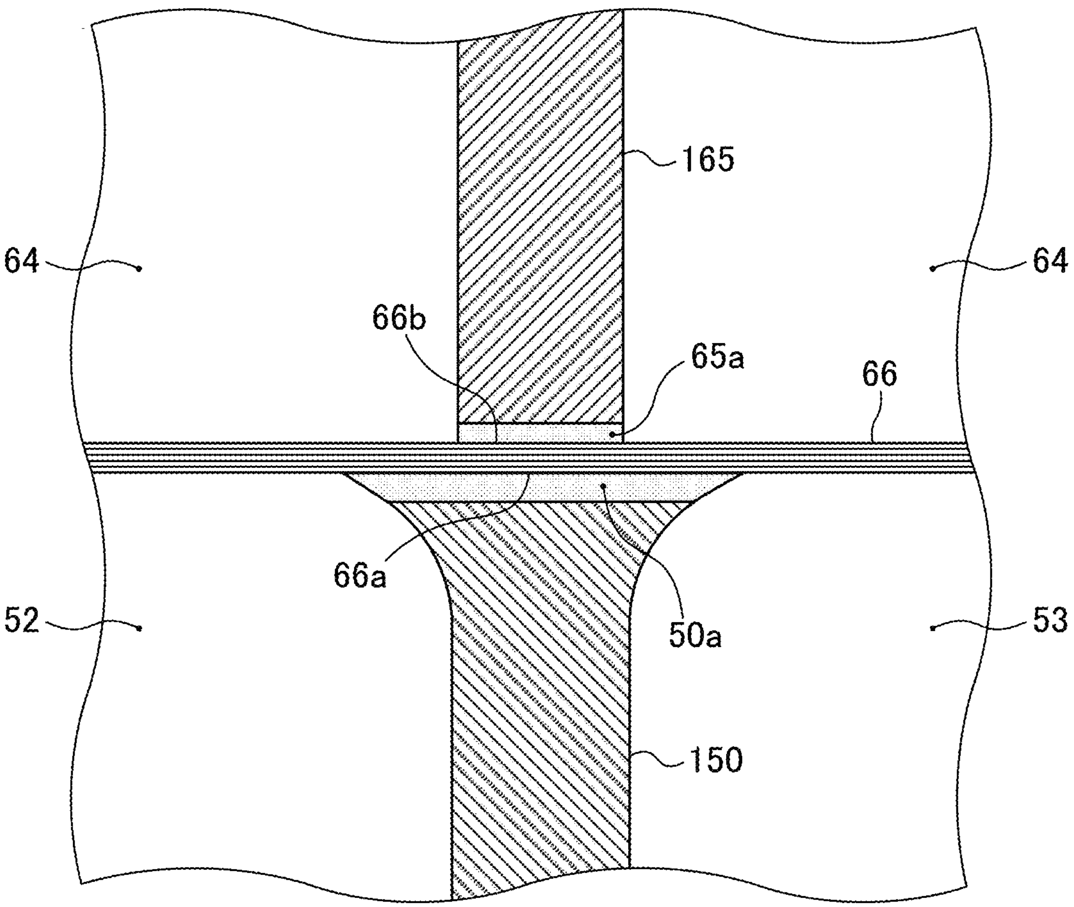
FIG. 11 is an enlarged, cross-sectional view of a primary portion of a liquid discharge head according to a second embodiment.

FIG. 11 is an enlarged, cross-sectional view of a primary portion of a head according to a second embodiment.

As illustrated in FIG. 11, according to the second embodiment, only the bonding portion between the channel partition wall 150 and the damper film 66 has a shape widening toward the end in cross-section, and the other structures are the same as those according to the first embodiment.

Third Embodiment

Figure 12:
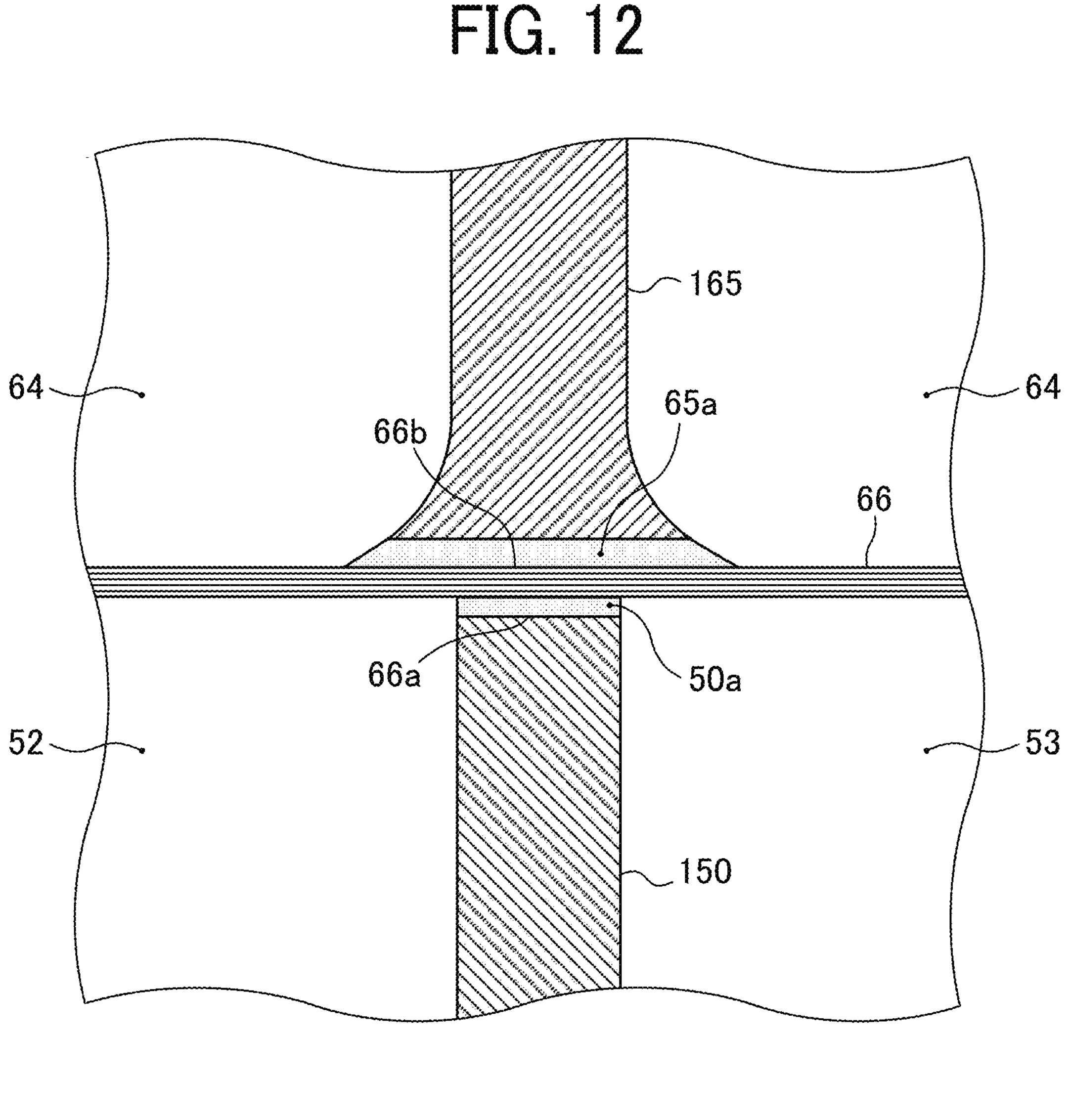
FIG. 12 is an enlarged, cross-sectional view of a primary portion of a liquid discharge head according to a third embodiment.

FIG. 12 is an enlarged, cross-sectional view of a primary portion of a head according to a third embodiment.

As illustrated in FIG. 12, according to the third embodiment, only the bonding portion between the void partition wall 165 and the damper film 66 has a shape widening toward the end in cross-section, and the other structures are the same as those according to the first embodiment.

Fourth Embodiment

Figure 13:
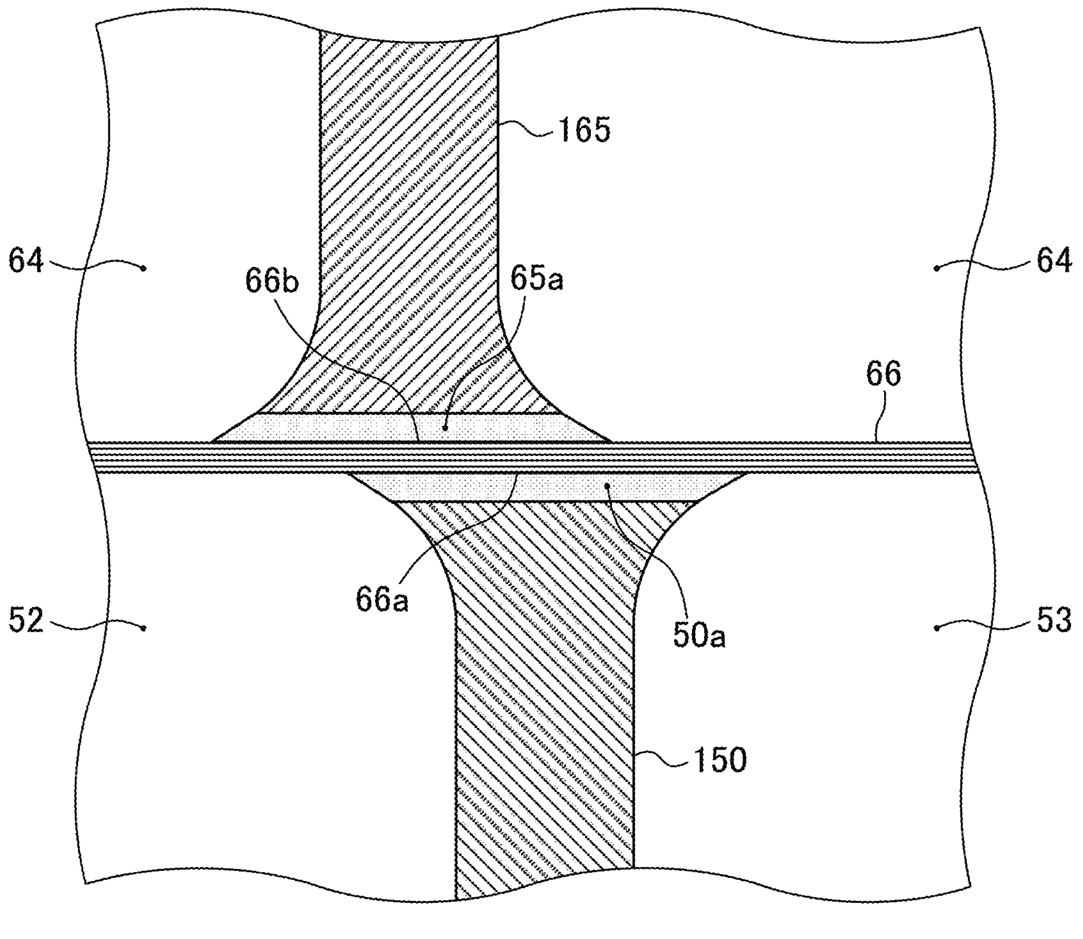
FIG. 13 is an enlarged, cross-sectional view of a primary portion of a liquid discharge head according to a fourth embodiment.

FIG. 13 is an enlarged, cross-sectional view of a primary portion of a head according to a fourth embodiment.

As illustrated in FIG. 13, according to the fourth embodiment, the void partition wall 165 is bonded to the damper film 66 at a position displaced from the channel partition wall 150, and the other structures are the same as those according to the first embodiment.

COMPARATIVE EXAMPLE 1

According to a comparative example 1, both the angle formed between the damper film 66 and the bonding portion of the void partition wall 165 illustrated in FIG. 9 and the angle formed between the damper film 66 and the bonding portion of the channel partition wall 150 are right angles, and the other structures are the same as those according to the first embodiment.

According to the comparative example 1, faulty discharge was found during the 100 billionth discharge evaluation, and a crack was observed in the damper film 66 as a result of observation of the damper film 66 with an IR microscope. On the other hand, according to the first embodiment to the fourth embodiment in which the structure widening toward the end is provided, no faulty discharge was found during the 100 billionth discharge evaluation, and no crack was observed in the damper film 66 as a result of observation of the damper film 66 with an IR microscope.

The above-described driving endurance test made it clear that the shape widening toward the end in cross-section of at least one of the bonding portion of the common channel substrate 50 with the damper film 66 or the bonding portion of the damper frame substrate 65 with the damper film 66 may suppress the occurrence of cracks in the damper film 66.

When only one of the common channel substrate 50 or the damper frame substrate 65 has a shape widening toward the end as in the second embodiment and the third embodiment, large deformation of the damper film 66 may cause stress concentration at the edge portion of the bond surface that does not include the shape widening toward the end. On the other hand, when both the common channel substrate 50 and the damper frame substrate 65 have a shape widening toward the end as in the first embodiment, there is an advantage such that the occurrence of stress concentration may be well suppressed even when the deformation of the damper film 66 is large. On the other hand, when only one of the common channel substrate 50 or the damper frame substrate 65 has a shape widening toward the end as in the second embodiment and the third embodiment, there is the advantage described below. That is, compared with the case according to the first embodiment, there are advantages of a gradual increase in the rigidity of the bonding portion from the edge portion of the bond surface and more smooth deformation of the bond surface of the damper film.

Depending on the structure of the apparatus, only the adhesive layers 50*a*, 65*a* may have a shape widening toward the end in cross-section. The damper frame substrate 65 and the common channel substrate 50 may be bonded to the damper film 66 by bonding methods other than adhesives.

Next, an example of a head module including the head 1 according to the present embodiment will be described referring to FIGS. 14 and 15.

Figure 14:
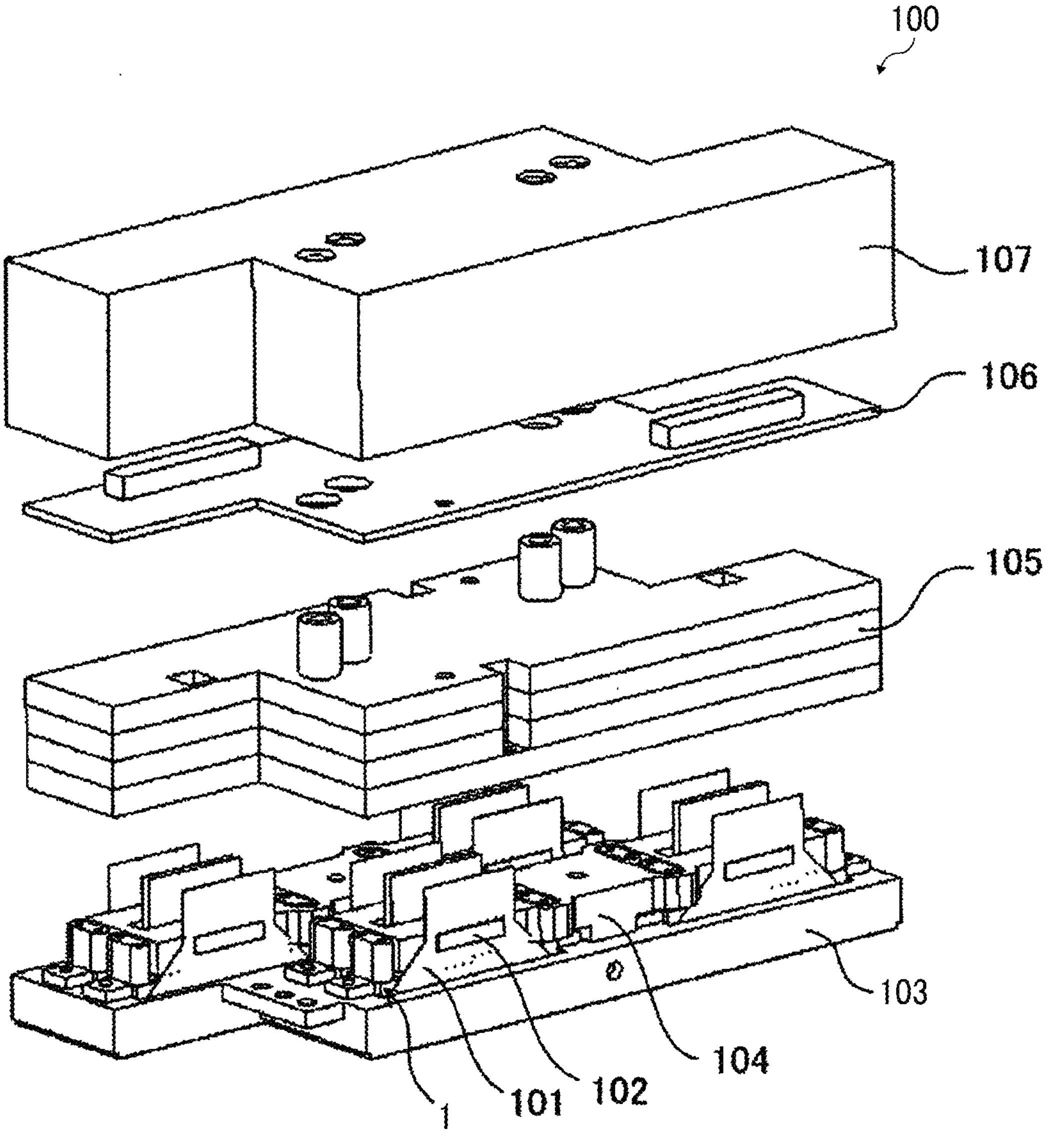
FIG. 14 is an exploded, perspective view of a head module according to the present embodiment.

FIG. 14 is an exploded, perspective view of the head module according to the present embodiment.

Figure 15:
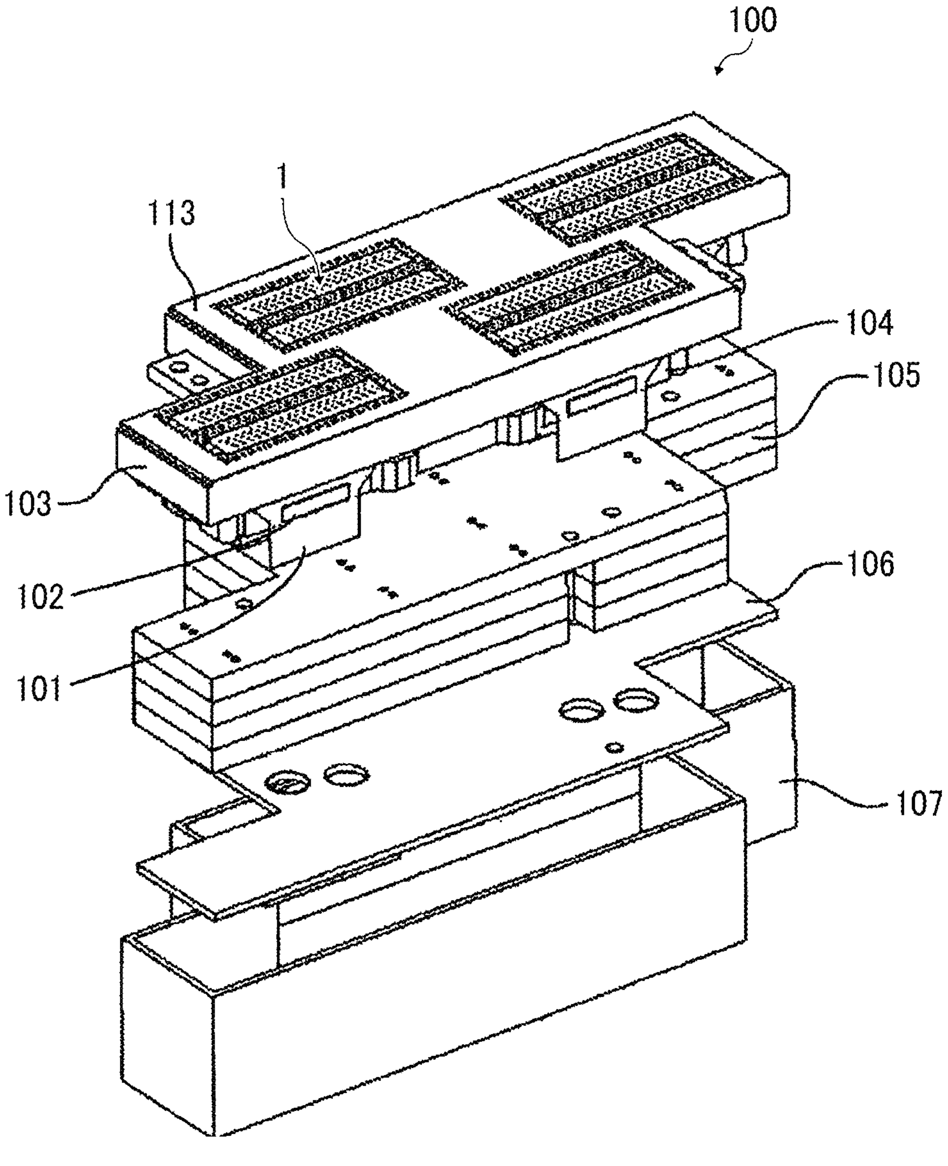
FIG. 15 is an exploded, perspective view of the head module according to the present embodiment when viewed from a nozzle surface side.

FIG. 15 is an exploded, perspective view of the head module according to the present embodiment when viewed from the nozzle surface side.

A head module 100 includes the head 1 that discharges the liquid, a base member 103 that holds the heads 1, and a cover member 113 serving as a nozzle cover 15 for the heads 1. The head module 100 includes a heat dissipation member 104, a manifold 105 forming channels to supply the liquid to the heads 1, a printed circuit board (PCB) 106 coupled to a flexible wiring substrate 101, and a module case 107.

Next, an example of the liquid discharge apparatus according to the present embodiment will be described referring to FIGS. 16 and 17.

Figure 16:
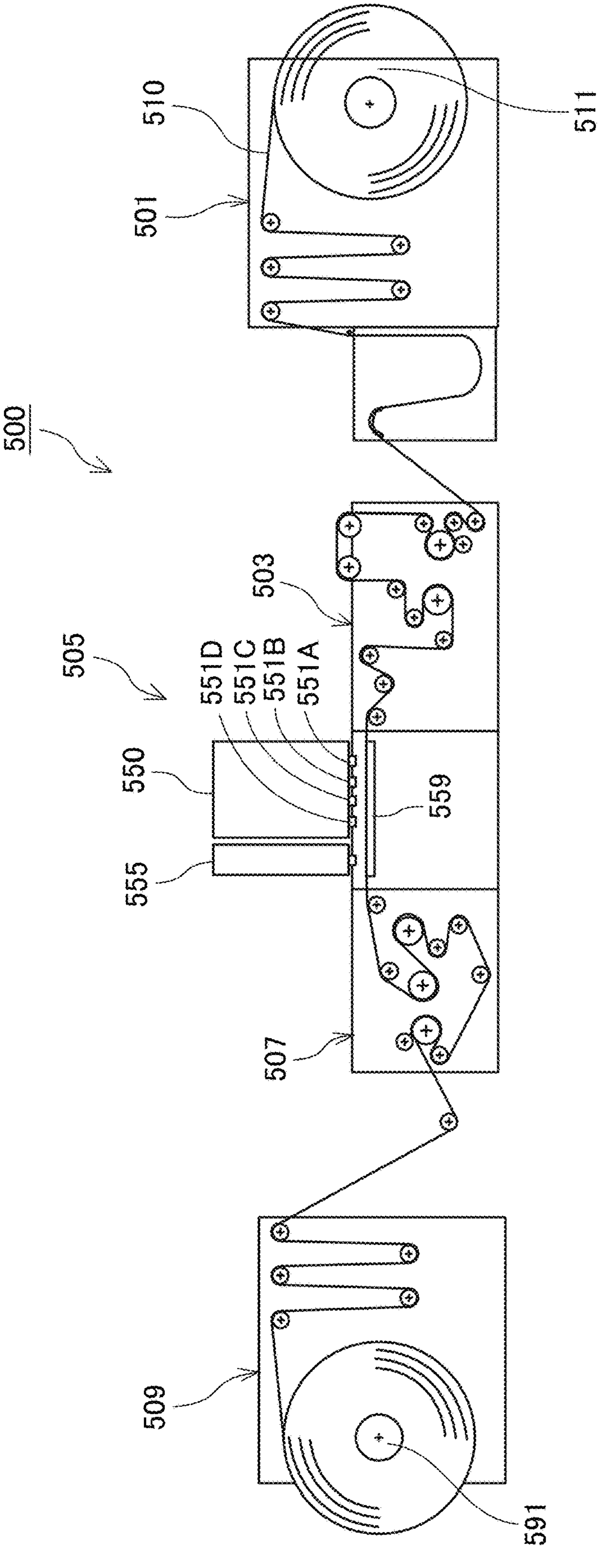
FIG. 16 is a schematic view of a printing apparatus that is an inkjet recording apparatus as the liquid discharge apparatus according to the present embodiment.

FIG. 16 is a schematic view of a printing apparatus that is an inkjet recording apparatus as the liquid discharge apparatus according to the present embodiment.

Figure 17:
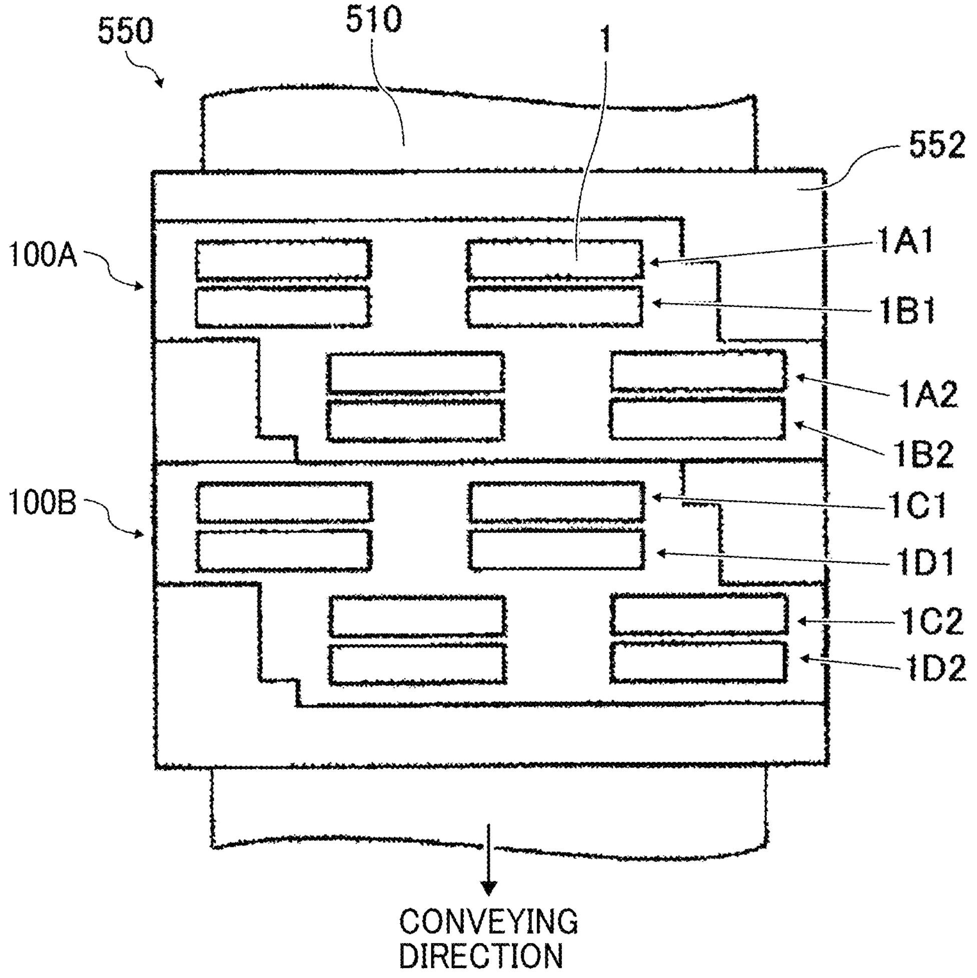
FIG. 17 is a plan view of an example of a head unit of the printing apparatus according to the present embodiment.

FIG. 17 is a plan view of an example of a head unit of the printing apparatus according to the present embodiment.

A printing apparatus 500, which is the liquid discharge apparatus, includes a feeder 501 that feeds a continuous medium 510 and a guide conveyor 503 that guides and conveys the continuous medium 510 fed from the feeder 501 to a printing unit 505. The printing apparatus 500 further includes the printing unit 505 that discharges the liquid onto the continuous medium 510 to form an image for printing, a dryer 507 that dries the continuous medium 510, an ejector 509 that ejects the continuous medium 510, etc.

The continuous medium 510 is fed from a winding roller 511 of the feeder 501, guided and conveyed by rollers of the feeder 501, the guide conveyor 503, the dryer 507, and the ejector 509, and wound around a take-up roller 591 of the ejector 509. In the printing unit 505, the continuous medium 510 is conveyed opposite a head unit 550 on a conveyance guide member 559. The head unit 550 discharges the liquid to form an image on the continuous medium 510 for printing.

In the printing apparatus 500 according to the present embodiment, the head unit 550 includes two head modules 100A and 100B according to the present embodiment described above in a common base member 552.

When the alignment direction of the heads 1 in the direction perpendicular to the conveying direction of the head modules 100A and 100B is a head alignment direction, head arrays 1A1 and 1A2 of the head module 100A discharge the liquid in the identical color. Similarly, head arrays 1B1 and 1B2 of the head module 100A are grouped as one set that discharge the liquid of the desired color. Head arrays 1C1 and 1C2 of the head module 100B are grouped as one set that discharge the liquid of the desired color. Head arrays 1D1 and 1D2 of the head module 100B are grouped as one set to discharge the liquid of the desired color.

Next, another example of the printing apparatus as the liquid discharge apparatus according to the present embodiment will be described referring to FIGS. 18 and 19.

Figure 18:
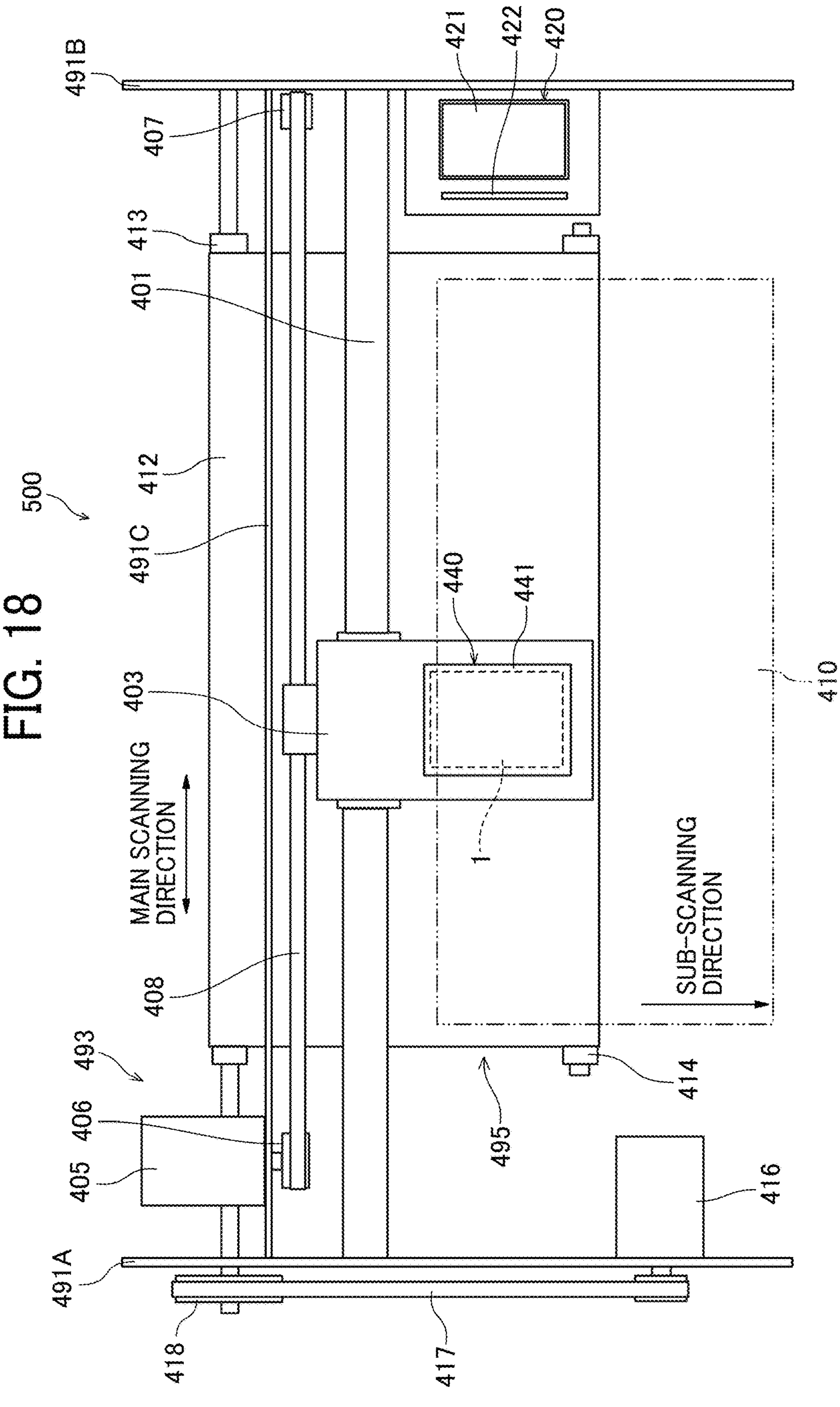
FIG. 18 is a plan view of a primary portion of the printing apparatus according to the present embodiment.

FIG. 18 is a plan view of a primary portion of the printing apparatus according to the present embodiment.

Figure 19:
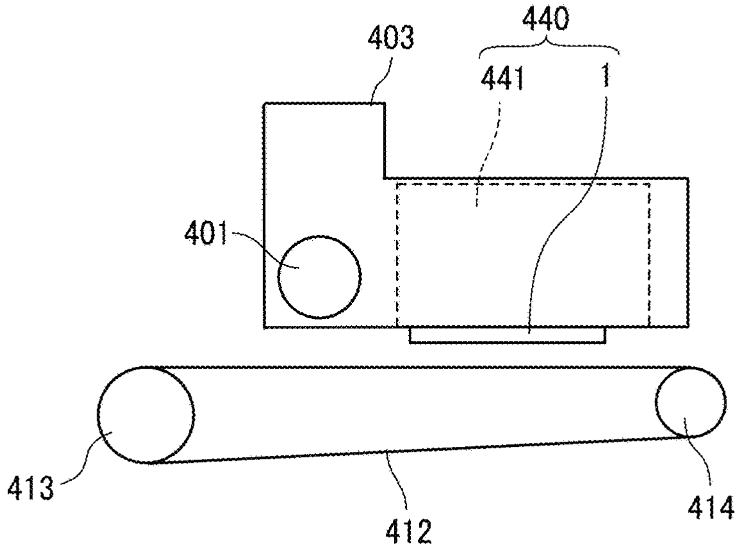
FIG. 19 is a side view of the primary portion of the printing apparatus according to the present embodiment.

FIG. 19 is a side view of the primary portion of the printing apparatus according to the present embodiment.

The printing apparatus 500 according to the present embodiment is a serial apparatus so that a main-scanning movement mechanism 493 reciprocally moves a carriage 403 in a main scanning direction. The main-scanning movement mechanism 493 includes a guide member 401, a main-scanning motor 405, a timing belt 408, and the like. The guide member 401 is bridged between a left-side plate 491A and a right-side plate 491B to moveably hold the carriage 403.

The main-scanning motor 405 reciprocally moves the carriage 403 in the main scanning direction via the timing belt 408 bridged between a drive pulley 406 and a driven pulley 407.

The carriage 403 includes a liquid discharge unit 440 in which the head 1, which is the head according to the present embodiment, and a head tank 441 are formed as a single unit. The head 1 of the liquid discharge unit 440 discharges the liquid of each color, for example, yellow (Y), cyan (C), magenta (M), and black (K). The head 1 includes a nozzle array including a plurality of nozzles arrayed in a sub-scanning direction perpendicular to the main scanning direction to discharge the liquid in a downward direction.

The head 1 is coupled to a liquid circulation device so that the liquid of the desired color is supplied in circulation.

The printing apparatus 500 includes a conveyor mechanism 495 to convey a sheet 410. The conveyor mechanism 495 includes a conveyance belt 412 as a conveyor and a sub-scanning motor 416 to drive the conveyance belt 412. The conveyance belt 412 attracts the sheet 410 and conveys the sheet 410 at a position facing the head 1. The conveyance belt 412 is an endless belt stretched between a conveyance roller 413 and a tension roller 414. Attraction may be applied by electrostatic attraction, air suction, or the like. The conveyance belt 412 rotates in the sub-scanning direction as the conveyance roller 413 is rotationally driven by the sub-scanning motor 416 via a timing belt 417 and a timing pulley 418.

At one side in the main scanning direction of the carriage 403, a maintenance mechanism 420 to maintain the head 1 is disposed on a lateral side of the conveyance belt 412. The maintenance mechanism 420 includes, for example, a cap member 421 to cap the nozzle surface of the head 1 and a wiper member 422 to wipe the nozzle surface. The main-scanning movement mechanism 493, the maintenance mechanism 420, and the conveyor mechanism 495 are installed in a chassis including a left-side plate 491A, a right-side plate 491B, and a back plate 491C.

In the printing apparatus 500 having the above configuration, the sheet 410 is fed onto the conveyance belt 412 and is attracted, and the sheet 410 is conveyed in the sub-scanning direction by the rotation of the conveyance belt 412. The head 1 is driven in response to image signals while the carriage 403 is moved in the main scanning direction so that the liquid is discharged to the stopped sheet 410 to form an image on the sheet 410.

Next, another example of the liquid discharge unit according to the present embodiment will be described referring to FIG. 20.

Figure 20:
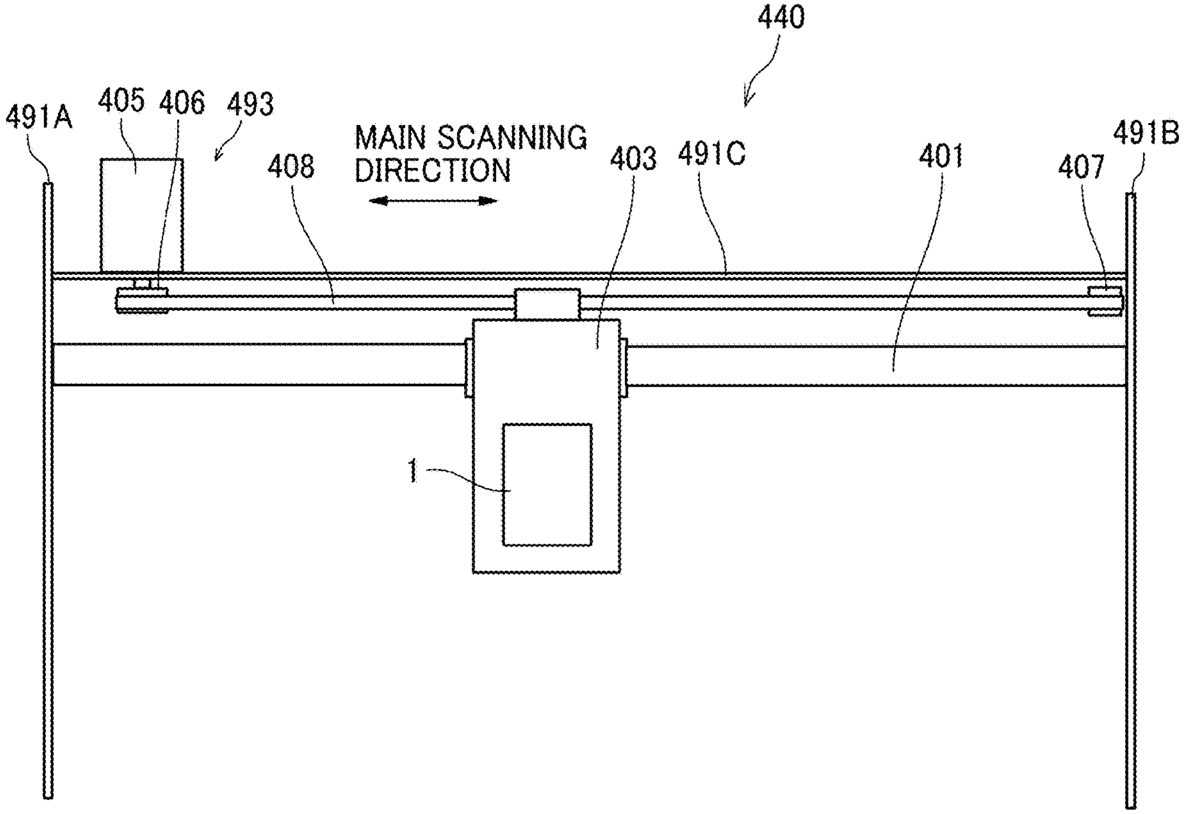
FIG. 20 is a plan view of a primary portion of a liquid discharge unit according to the present embodiment.

FIG. 20 is a plan view of a primary portion of the liquid discharge unit according to the present embodiment.

The liquid discharge unit 440 includes the components forming the liquid discharge apparatus including a chassis portion including the left-side plate 491A, the right-side plate 491B, and the back plate 491C, the main-scanning movement mechanism 493, the carriage 403, and the head 1.

It is also possible to configure a liquid discharge unit in which the maintenance mechanism 420 described above is further mounted on, for example, the right-side plate 491B of the liquid discharge unit 440.

Next, further another example of the liquid discharge unit according to the present embodiment will be described referring to FIG. 21.

Figure 21:
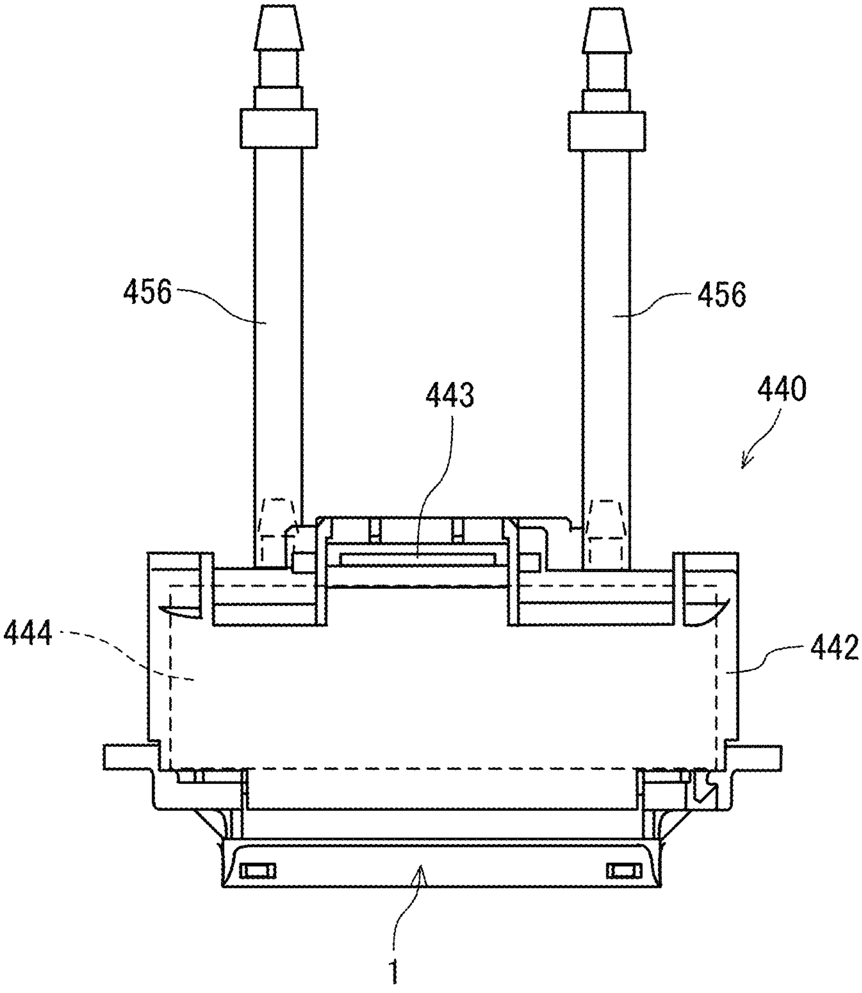
FIG. 21 is a front view of the liquid discharge unit according to the present embodiment.

FIG. 21 is a front view of the liquid discharge unit according to the present embodiment.

The liquid discharge unit 440 includes the head 1, to which a channel component 444 is attached, and tubes 456 coupled to the channel component 444.

The channel component 444 is disposed inside a cover 442. The head tank 441 may be included instead of the channel component 444. A connector 443 electrically connected to the head 1 is provided on an upper portion of the channel component 444.

According to the present embodiment, the discharged liquid is not limited to a particular liquid as long as the liquid has a viscosity or surface tension that allows discharge from the head. However, the viscosity of the liquid is preferably 30 mPa·s or less under ordinary temperature and ordinary pressure or by heating or cooling. Specific examples include solvents such as water and organic solvents, colorants such as dyes and pigments, polymerizable compounds, resins, and function-adding materials such as surfactants. Examples further include solutions, suspensions, and emulsions, and the like, containing DNA, amino acids, proteins, biocompatible materials such as calcium, and edible materials such as natural dyes. Such a solution, a suspension, or an emulsion may be used for, e.g., inkjet ink, surface treatment solution, a liquid for forming components of electronic elements or light-emitting elements or resist patterns of electronic circuits, or a material solution for three-dimensional fabrication.

Examples of the source to generate energy for discharging the liquid include a piezoelectric actuator (a laminated piezoelectric element or a thin-film piezoelectric element), a thermal actuator that employs a thermoelectric conversion element, such as a heating resistor, and an electrostatic actuator including a diaphragm and opposed electrodes.

The "liquid discharge unit" includes the liquid discharge head and a functional component or mechanism as a single unit and includes an assembly of components regarding liquid discharge. For example, the "liquid discharge unit" includes a combination of the liquid discharge head with at least one of the configurations of the head tank, the carriage, the supply mechanism, the maintenance mechanism, the main-scanning movement mechanism, and the liquid circulation device.

Examples of the "single unit" include a unit in which the liquid discharge head and a functional component or mechanism are secured to each other through fastening, bonding, engaging, or the like, and a unit in which one of the head and a functional component or mechanism is movably held by the other. The liquid discharge head may be detachably attached to a functional component or mechanism.

For example, the liquid discharge head and the head tank may form a single unit as the liquid discharge unit. The liquid discharge head and the head tank coupled with a tube, or the like, may form a single unit. A unit including a filter may be additionally provided between the head tank and the liquid discharge head of the liquid discharge unit.

The liquid discharge head and the carriage may form a single unit as the liquid discharge unit.

The liquid discharge unit may include the liquid discharge head movably held by a guide member forming part of the main-scanning movement mechanism so that the liquid discharge head and the main-scanning movement mechanism form a single unit. The liquid discharge head, the carriage, and the main-scanning movement mechanism may form a single unit.

A cap member forming part of the maintenance mechanism may be secured to the carriage having the liquid discharge head mounted thereon so that the liquid discharge head, the carriage, and the maintenance mechanism form a single unit as the liquid discharge unit.

A tube may be coupled to the liquid discharge head having the head tank or the channel component attached thereto so that the liquid discharge head and the supply mechanism form a single unit as the liquid discharge unit. A liquid in a liquid reservoir source is supplied to the liquid discharge head through the tube.

The main-scanning movement mechanism also includes a guide member alone. The supply mechanism also includes a tube alone or a loading unit alone.

The "liquid discharge unit" described here includes the combination with the liquid discharge head, but the "liquid discharge unit" also includes a single unit including a head module or head unit including the above-described liquid discharge head and a functional component or mechanism.

The "liquid discharge apparatus" includes an apparatus including the liquid discharge head, the liquid discharge unit, the head module, the head unit, and the like, to drive the liquid discharge head and discharge the liquid. The liquid discharge apparatus also includes an apparatus that discharges the liquid toward gas or into a liquid as well as an apparatus that may discharge a liquid to a material to which the liquid may adhere.

The "liquid discharge apparatus" may also include units regarding feeding, conveyance, and paper ejection of a material to which the liquid may adhere, pretreatment apparatuses, post-treatment apparatuses, etc.

The "liquid discharge apparatus" may include, for example, an image forming apparatus that discharges the ink to form an image on a sheet and a solid fabrication apparatus (three-dimensional fabrication apparatus) that discharges a fabrication liquid to a powder layer, in which powder material is formed in layers, to form a solid fabrication object (three-dimensional fabrication object).

The "liquid discharge apparatus" is not limited to an apparatus that discharges the liquid to visualize meaningful images, such as letters or figures. For example, the liquid discharge apparatus also includes an apparatus that forms arbitrary patterns, or the like, or fabricate three-dimensional images.

The above-described "material to which the liquid may adhere" may refer to a material to which the liquid may adhere at least temporarily, a material to which the liquid adheres to be fixed, or a material to which the liquid adheres to permeate. Examples thereof include recording media, such as paper, recording paper, recording sheet, film, and cloth, electronic component, such as electronic substrate and piezoelectric element, and media, such as powder layer, organ model, and testing cell. The "material to which the liquid may adhere" includes any material to which the liquid adheres unless limited.

Examples of the "material to which the liquid may adhere" may include any materials to which the liquid may adhere even temporarily, such as paper, thread, fiber, fabric, leather, metal, plastic, glass, wood, and ceramic.

The "liquid discharge apparatus" may include, but is not limited thereto, an apparatus that relatively moves the liquid discharge head and the material to which the liquid may adhere. Examples thereof include a serial apparatus that moves the liquid discharge head or a line apparatus that does not move the liquid discharge head.

Examples of the "liquid discharge apparatus" further include a treatment liquid application apparatus that discharges a treatment liquid to a sheet to apply the treatment liquid to a sheet surface in order to reform the sheet surface. Examples of the "liquid discharge apparatus" further include an injection granulation apparatus that sprays a composition liquid, in which raw materials are dispersed in a solution, through a nozzle to granulate fine particles of the raw material.

The terms "image formation", "recording", "printing", "image printing", and "fabricating" used herein may be used synonymously with each other.

The above-described embodiments are examples, and each of the following aspects has a specific advantageous effect.

Aspect 1

The liquid discharge head 1 that drives an electromechanical conversion element such as the piezoelectric element 40 to discharge a liquid such as ink, supplied from a liquid channel, in each of the pressure chambers 21 through each of the nozzles 11, and the liquid discharge head includes a damper film bonded to a channel substrate such as the common channel substrate 50 including the liquid channel, and a damper substrate such as the damper frame substrate 65 bonded to a surface of the damper film on an opposite side of a bond surface with the channel substrate to cause the damper film to perform a damper function, wherein in a cross-sectional view taken in a laminating direction in which the channel substrate, the damper film, and the damper substrate are laminated, at least one of a bonding portion of the channel substrate with the damper film or a bonding portion of the damper substrate with the damper film has a shape widening toward an end such that an angle formed with the damper film is an acute angle.

The failure described below occurs in the comparative example 1 illustrated in FIG. 9, where the bonding portion of the damper substrate such as the damper frame substrate 65 with the damper film 66 and the bonding portion of the channel substrate such as the common channel substrate 50 with the damper film 66 both have a cross-sectional shape extending perpendicular to the damper film 66. Specifically, during damping of the damper film 66, the damper film 66 is rapidly deformed based on the edge portion A1 of the bond surface 66*b* of the damper film 66 with the damper substrate and the edge portion A2 of the bond surface 66*a* with the channel substrate. As a result, a failure occurs such that stress is concentrated at the edge portions A1 and A2 of the bonded surfaces of the damper film 66, and cracks occur in the damper film 66 due to the usage over time.

Conversely, according to the aspect 1, the cross-sectional shape of at least one of the bonding portion of the damper substrate with the damper film 66 or the bonding portion of the channel substrate with the damper film 66 is a shape widening toward the end such that the angle formed with the damper film 66 is an acute angle. Thus, at least one of the bonding portion of the damper substrate or the bonding portion of the channel substrate has a shape such that the thickness gradually decreases toward the edge portions A1 and A2 of the bond surfaces 66*a* and 66*b* of the damper film 66, and the rigidity of the bonding portion may be gradually decreased toward the edge portion of the above-described bond surface. This may cause, during damping of the damper film, elastic deformation of the bonding portion together with the damper film and cause gradual deformation of the vicinity of the edge portion of the bond surface of the damper film 66. Thus, it is possible to suppress the occurrence of stress concentration in the damper film 66 during damping of the damper film and to suppress the occurrence of cracks in the damper film 66.

Aspect 2

According to the aspect 1, at least one of the channel substrate such as the common channel substrate 50 or the damper substrate such as the damper frame substrate 65 is bonded with an adhesive, and a cross-sectional shape of an adhesive layer including the adhesive is a shape widening toward an end such that an angle formed with the damper film 66 is an acute angle.

This may prevent the occurrence of stress concentration in the damper film 66.

Aspect 3

According to the aspect 1, cross-sectional shapes of both the bonding portion of the channel substrate such as the common channel substrate 50 and the bonding portion of the damper substrate such as the damper frame substrate 65 are a shape widening toward an end such that an angle formed with the damper film 66 is an acute angle.

Thus, as described in the embodiment, compared with the case where only either one of the bonding portion of the channel substrate such as the common channel substrate 50 or the bonding portion of the damper substrate such as the damper frame substrate 65 has a shape widening toward the end in cross-section, the occurrence of stress concentration in the damper film 66 may be suppressed.

Aspect 4

The liquid discharge head 1 that drives an electromechanical conversion element such as the piezoelectric element 40 to discharge a liquid such as ink, supplied from a liquid channel, in each of the pressure chambers 21 through each of the nozzles 11, and the liquid discharge head includes a damper film bonded to a channel substrate such as the common channel substrate 50 including the liquid channel, and a damper substrate such as the damper frame substrate 65 bonded to a surface of the damper film on an opposite side of a bond surface with the channel substrate to cause the damper film to perform a damper function, wherein in a cross-sectional view taken in a laminating direction in which the channel substrate, the damper film, and the damper substrate are laminated, at least one of a bonding portion of the channel substrate with the damper film or a bonding portion of the damper substrate with the damper film has a thickness of an edge portion of the bonding portion in the laminating direction smaller than a thickness of a central portion of the bonding portion.

Thus, the rigidity of the edge portion (the edge portions A1 and A2 of the bond surfaces according to the embodiment) of the bonding portions may be lower than that of the central portion, and during damping of the damper film, the bonding portion deforms elastically together with the damper film, and the vicinity of the edge portion of the bond surface of the damper film 66 may gradually deform. Thus, it is possible to suppress the occurrence of stress concentration in the damper film 66 during damping of the damper film and to suppress the occurrence of cracks in the damper film 66.

Aspect 5

According to the aspect 4, at least one of the bonding portion of the channel substrate such as the common channel substrate 50 with the damper film or the bonding portion of the damper substrate such as the damper frame substrate 65 with the damper film has a thickness decreasing toward the edge portion of the bonding portion in the laminating direction.

As described in the embodiment, this may achieve gradual deformation of the vicinity of the edge portion of the bond surface of the damper film 66, may suppress the occurrence of stress concentration in the damper film 66 during damping of the damper film, and may suppress the occurrence of cracks in the damper film 66.

Aspect 6

According to the aspect 1, the damper film 66 forms a wall surface of a common chamber (the common supply channel branch stream 52 or the common collection channel branch stream 53 according to the present embodiment) of the common channel substrate 50, and the damper substrate such as the damper frame substrate 65 includes a void portion such as the void 64 that allows displacement of the damper film 66 at an area facing the common chamber through the damper film 66.

Accordingly, as described in the embodiment, the pressure fluctuations occurring in the liquid channel during liquid discharge through the nozzle 11 may be absorbed by the damping of the damper film 66, and the effect (e.g., crosstalk) on the other nozzles 11 may be suppressed. This may stabilize the liquid discharge accuracy of each of the nozzles 11.

Aspect 7

The liquid discharge unit includes the liquid discharge head according to the aspect 1.

Aspect 8

The liquid discharge apparatus includes the liquid discharge head according to the aspect 1, or the liquid discharge unit according to the aspect 7.

Aspect 9

A liquid discharge head includes: multiple pressure chambers respectively communicating with multiple nozzles from each of which a liquid is discharged; a diaphragm defining a part of a wall of the multiple pressure chambers; an electromechanical conversion element attached to the diaphragm, the electromechanical conversion element configured to deform the diaphragm to discharge the liquid in the multiple pressure chambers through the multiple nozzles in a discharge direction; a damper film having a first surface and a second surface opposite to the first surface; a channel substrate including: a common chamber communicating with each of the multiple pressure chambers; and a first bonding portion bonded to the first surface of the damper film; and a damper substrate including a second bonding portion bonded to the second surface of the damper film, wherein at least one of the first bonding portion or the second bonding portion has a shape widening toward the damper film, and an angle of said at least one of the first bonding portion or the second bonding portion with the damper film is an acute angle.

Aspect 10

In the liquid discharge head according to aspect 9, the channel substrate is bonded to the damper film with an adhesive layer, and the adhesive layer has a cross-sectional shape widening toward the damper film, and an angle of the adhesive layer with the damper film is an acute angle.

Aspect 11

In the liquid discharge head according to aspect 9, a thickness of an edge portion of the first bonding portion is smaller than a thickness of a central portion of the first bonding portion in the discharge direction.

Aspect 12

In the liquid discharge head according to aspect 11, a thickness of the first bonding portion decreases toward the edge portion in the discharge direction.

Aspect 13

In the liquid discharge head according to aspect 9, the damper substrate is bonded to the damper film with an adhesive layer, and the adhesive layer has a cross-sectional shape widening toward the damper film, and an angle of the adhesive layer with the damper film is an acute angle.

Aspect 14

In a liquid discharge head according to aspect 9, a thickness of an edge portion of the second bonding portion is smaller than a thickness of a central portion of the second bonding portion in the discharge direction.

Aspect 15

In the liquid discharge head according to aspect 14, a thickness of the second bonding portion decreases toward the edge portion in the discharge direction.

Aspect 16

In the liquid discharge head according to aspect 9, the channel substrate is bonded to the damper film with an adhesive forming a first adhesive layer, and the damper substrate is bonded to the damper film with an adhesive forming a second adhesive layer, and each of the first adhesive layer and the second adhesive layer has a cross-sectional shape widening toward the damper film, and an angle of each of the first adhesive layer and the second adhesive layer with the damper film is an acute angle.

Aspect 17

In the liquid discharge head according to aspect 9, the damper substrate has a void portion facing the first surface of the damper film opposite to the second surface of the damper film facing the common chamber.

Aspect 18

A liquid discharge unit comprising the liquid discharge head according to aspect 9.

Aspect 19

A liquid discharge apparatus comprising the liquid discharge unit according to aspect 18.

The above described head 1 can achieve desired liquid discharge over time.

In the above-described embodiments of the present embodiment, the configuration requirements may be modified, added, or deleted as appropriate without departing from the scope of the present embodiment. The present embodiment is not limited to the embodiments described above, and many modifications are possible within the technical concept of the present embodiment by persons skilled in the art.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The invention claimed is:

1. A liquid discharge head comprising:

multiple pressure chambers respectively communicating with multiple nozzles from each of which a liquid is discharged;

a diaphragm defining a part of a wall of the multiple pressure chambers;

an electromechanical conversion element attached to the diaphragm, the electromechanical conversion element configured to deform the diaphragm to discharge the liquid in the multiple pressure chambers through the multiple nozzles in a discharge direction;

a damper film having a first surface and a second surface opposite to the first surface;

a channel substrate including:

a common chamber communicating with each of the multiple pressure chambers; and a first bonding portion bonded to the first surface of the damper film; and a damper substrate including a second bonding portion bonded to the second surface of the damper film, wherein:

at least one of the first bonding portion or the second bonding portion has a shape widening toward the damper film, an angle of said at least one of the first bonding portion or the second bonding portion with the damper film is an acute angle, and a thickness of an edge portion of the first bonding portion is smaller than a thickness of a central portion of the first bonding portion in the discharge direction.

2. The liquid discharge head according to claim 1, wherein;

the channel substrate is bonded to the damper film with an adhesive layer, the adhesive layer has a cross-sectional shape widening toward the damper film, and an angle of the adhesive layer with the damper film is an acute angle.

3. The liquid discharge head according to claim 1, wherein:

a thickness of the first bonding portion decreases toward the edge portion in the discharge direction.

4. The liquid discharge head according to claim 1, wherein:

the damper substrate is bonded to the damper film with an adhesive layer, the adhesive layer has a cross-sectional shape widening toward the damper film, and an angle of the adhesive layer with the damper film is an acute angle.

5. The liquid discharge head according to claim 1, wherein:

the channel substrate is bonded to the damper film with an adhesive forming a first adhesive layer, the damper substrate is bonded to the damper film with an adhesive forming a second adhesive layer, each of the first adhesive layer and the second adhesive layer has a cross-sectional shape widening toward the damper film, and an angle of each of the first adhesive layer and the second adhesive layer with the damper film is an acute angle.

6. The liquid discharge head according to claim 1, wherein:

the damper substrate has a void portion facing the first surface of the damper film opposite to the second surface of the damper film facing the common chamber.

7. A liquid discharge unit comprising the liquid discharge head according to claim 1.

8. A liquid discharge apparatus comprising the liquid discharge unit according to claim 7.

9. A liquid discharge head comprising:

multiple pressure chambers respectively communicating with multiple nozzles from each of which a liquid is discharged;

a diaphragm defining a part of a wall of the multiple pressure chambers;

an electromechanical conversion element attached to the diaphragm, the electromechanical conversion element configured to deform the diaphragm to discharge the liquid in the multiple pressure chambers through the multiple nozzles in a discharge direction;

a damper film having a first surface and a second surface opposite to the first surface;

a channel substrate including:

a common chamber communicating with each of the multiple pressure chambers; and a first bonding portion bonded to the first surface of the damper film; and a damper substrate including a second bonding portion bonded to the second surface of the damper film, wherein:

at least one of the first bonding portion or the second bonding portion has a shape widening toward the damper film, and an angle of said at least one of the first bonding portion or the second bonding portion with the damper film is an acute angle, a thickness of an edge portion of the second bonding portion is smaller than a thickness of a central portion of the second bonding portion in the discharge direction.

10. The liquid discharge head according to claim 9, wherein:

a thickness of the second bonding portion decreases toward the edge portion in the discharge direction.

11. The liquid discharge head according to claim 9, wherein:

the channel substrate is bonded to the damper film with an adhesive layer, the adhesive layer has a cross-sectional shape widening toward the damper film, and an angle of the adhesive layer with the damper film is an acute angle.

12. A liquid discharge head according to claim 9, wherein:

a thickness of an edge portion of the first bonding portion is smaller than a thickness of a central portion of the first bonding portion in the discharge direction.

13. The liquid discharge head according to claim 12, wherein:

a thickness of the first bonding portion decreases toward the edge portion in the discharge direction.

14. The liquid discharge head according to claim 9, wherein:

the damper substrate is bonded to the damper film with an adhesive layer, the adhesive layer has a cross-sectional shape widening toward the damper film, and an angle of the adhesive layer with the damper film is an acute angle.

* * * * *